I. A. MACHAMER.
BRAKE MECHANISM.
APPLICATION FILED MAR. 6, 1915.
1,159,240.
Patented Nov. 2, 1915.
2 SHEETS—SHEET 1.
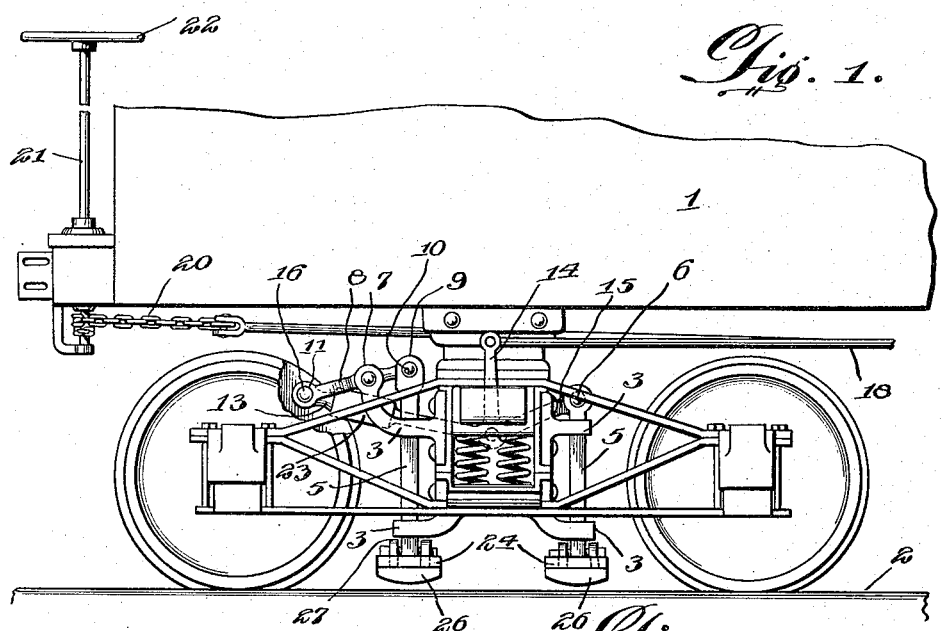
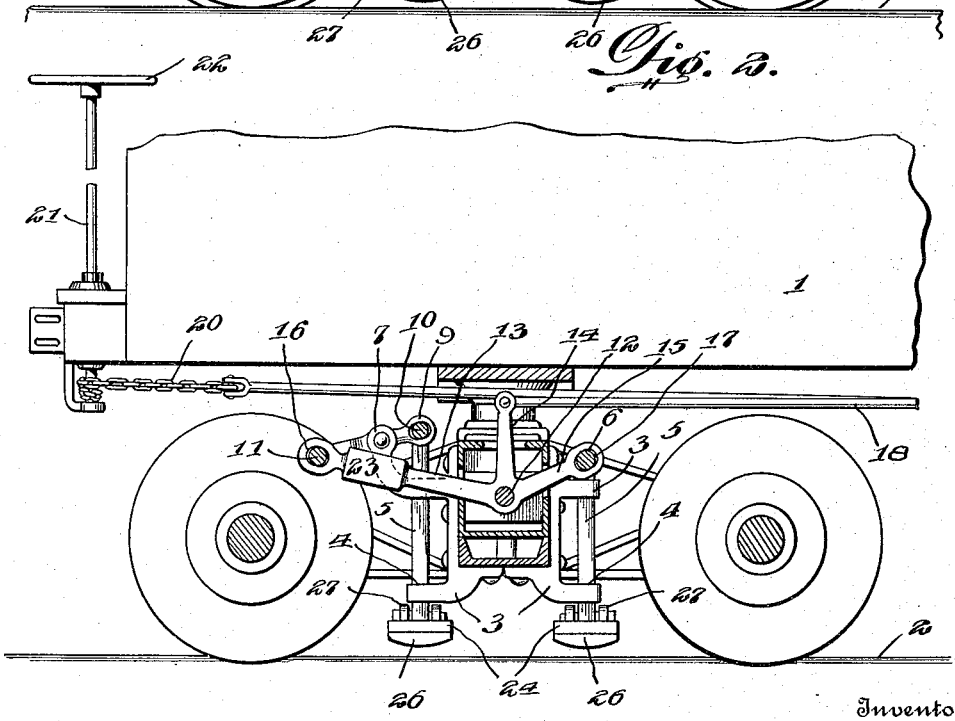
Witnesses
Frederick L. Fox.
John J. McCarthy
Inventor
Isaac A. Machamer.
By Victor J. Evans.
Attorney I. A. MACHAMER.
BRAKE MECHANISM.
APPLICATION FILED MAR. 6, 1915.
1,159,240.
Patented Nov. 2, 1915.
2 SHEETS—SHEET 2.
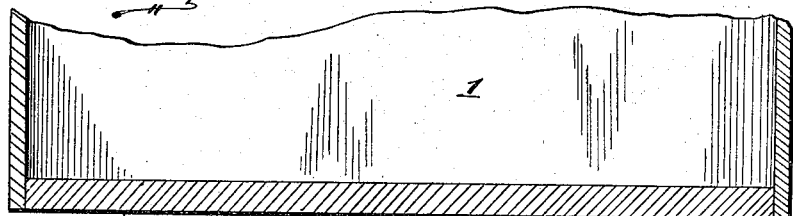
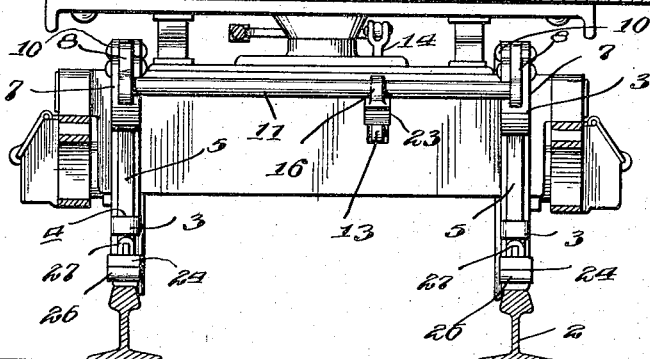
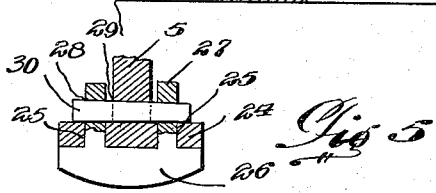
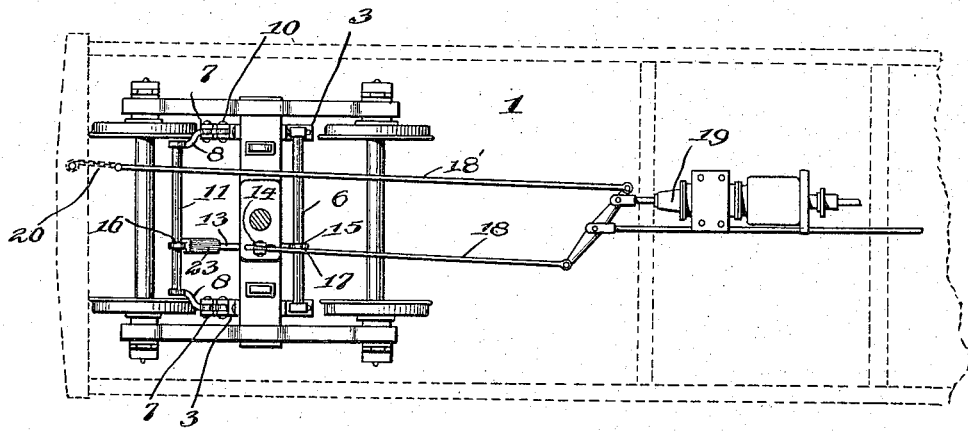
Inventor
Isaac A. Machamer.
Witnesses
Frederick L. Fox.
John J. McCarthy
By Victor J. Evans.
Attorney

UNITED STATES PATENT OFFICE.

ISAAC A. MACHAMER, OF WICONISCO, PENNSYLVANIA, ASSIGNOR OF ONE-HALF TO ALLEN BUDD, RICHARD BUDD, AND ANDREW BUDD, ALL OF WILLIAMSTOWN, PENNSYLVANIA.

BRAKE MECHANISM.

1,159,240.  Specification of Letters Patent.  Patented Nov. 2, 1915.

Application filed March 6, 1915. Serial No. 12,590.

*To all whom it may concern:*

Be it known that I, ISAAC A. MACHAMER, a citizen of the United States of America, residing at Wiconisco, in the county of Dauphin and State of Pennsylvania, have invented new and useful Improvements in Brake Mechanism, of which the following is a specification.

This invention relates to improvements in brake mechanism for railway cars and has particular application to a track brake.

In carrying out the present invention, it is my purpose to provide track brake apparatus wherein the brake shoes may be readily and quickly moved into engagement with the rails to check the speed of the car and moved out of engagement with the rails when it is desired to relieve the car of the influence of the brake apparatus.

It is also my purpose to improve and simplify the general construction of brake mechanism of the class described and to provide a track brake wherein the brake shoes may be actuated by air and by hand and wherein the component parts of the mechanism will be so arranged and correlated as to reduce the possibility of derangement to a minimum.

With the above and other objects in view, the invention consists in the construction, combination and arrangement of parts hereinafter set forth in and falling within the scope of the claim.

In the accompanying drawings; Figure 1 is a view in side elevation of a car equipped with track brake mechanism constructed in accordance with the present invention. Fig. 2 is a fragmentary longitudinal sectional view through the same. Fig. 3 is a transverse sectional view therethrough. Fig. 4 is a fragmentary top plan view showing the connections between the air cylinder and the brake mechanism and between the hand operated shaft and the brake mechanism. Fig. 5 is a sectional view through the brake shoe.

Referring now to the drawings in detail, 1 designates a car designed to traverse the trackway 2. Secured to an appropriate part of the frame of each truck of the car at each end of such frame and disposed upon opposite sides of the frame are pairs of guide lugs 3, the lugs of each pair being spaced apart vertically and formed with axially alining openings 4. In the respective pairs of lugs 3 are vertical rods 5. The upper ends of the rods 5 at the front side of the frame of the truck are interconnected by means of a horizontal bar 6, while secured to the upper lugs 3 of the respective pairs at the rear side of the frame of the truck are upwardly projecting yokes 7 and pivoted centrally of its ends, each yoke 7 is a lever 8. The forward ends of the levers 8 are formed with yokes 9 respectively that receive the upper ends of the adjacent rods 5 and these yokes are pivotally connected to such rods by means of transverse pivot pins 10. The rear ends of the levers 8 are interconnected by means of a horizontal bar 11. Pivoted upon a pin carried by a bracket arranged centrally of the frame of the truck is a hub 12 and radiating from the hub 12 are arms 13, 14 and 15. The arm 13 projects toward the rear of the truck and the rear end thereof is pivotally connected with the bar 11 as at 16, while the arm 15 projects toward the front end of the truck and the forward extremity thereof is pivotally connected to the bar 6 as at 17. The remaining arm 14 projects upwardly from the hub and is pivotally connected with a horizontal rod 18 slidably mounted within suitable bearings carried by the bottom of the car.

19 designates an air cylinder of the air brake system of the car and the outer end of the piston rod connected with the piston in such cylinder is connected with a brake lever, as usual. In the present instance, the rod 18′ has one end connected with one extremity of the brake lever and the opposite end connected through the medium of a chain 20 with the lower end of a vertical brake spindle 21 rotatably mounted within vertically alining bearings carried by the end of the car and having the upper extremity thereof equipped with a hand wheel 22, while a rod 18 has one extremity pivoted to the remaining end of such lever and the other extremity pivotally connected with the upper end of the arm 14, as clearly illustrated in Figs. 2 and 4 of the drawings.

The lower ends of the rods 5 are equipped with brake shoes respectively and, in the present instance, a cross piece 24 is fixed, between its ends, to the lower end of each rod 5 and is formed, at diametrically opposite sides of the rod, with vertical openings 25. 26 designates a brake shoe having the back thereof equipped with upwardly projecting lugs 27 adapted to pass through the openings 25 in the cross piece 24 and formed with transverse apertures 28 alining with a similar aperture 29 formed in the rod 5 adjacent to the lower extremity thereof. Through these alining apertures 28 and 29 is passed a securing pin 30 that acts to hold the brake shoe securely to the cross piece and also reinforces the connection between the cross piece and the lower end of the rod.

In practice, when it is desired to apply the brakes, the rod 18 is shifted longitudinally either under the action of the brake spindle 21, rod 18' and brake lever connected with such rod or under the action of the air cylinder 19 and in the longitudinal movement of the rod 18 the arm 14 swings and rotates the hub 12, thereby lowering the outer end of the arm 15 and elevating the rear end of the arm 13. In the downward movement of the forward end of the arm 15, the bar 6 and rods 5 are forced downwardly, thereby engaging the brake shoes on the lower ends of such rods with the rails. In the upward movement of the rear end of the arm 13 the levers 8 are swung about their pivotal connections with the yokes 7, thereby depressing the rods 5 and engaging the brake shoes on the lower ends of such rods with the rails, the brake shoes on the lower ends of the stems acting to check the speed of the car and bring the latter to a standstill. When the rod 18 is relieved of the influence of the actuating means, the weight 23 gravitates to lowered position, thereby lowering the rear end of the arm 13 and elevating the forward end of the arm 15 so that the brake shoes will be elevated and rendered inactive.

I claim:

In brake mechanism of the class described, the combination with a car truck, of pairs of lugs secured to the frame of the truck at each end thereof and disposed at opposite sides of the frame, the lugs of each pair being spaced apart vertically and formed with alining openings, rods slidably mounted within the openings in respective pairs of lugs, brake shoes on the lower ends of said rods adapted to engage the rails, a cross bar interconnecting the upper ends of the rods at the front side of the truck, levers pivoted adjacent to the upper ends of the rods at the rear side of the truck, pivotal connections between the forward ends of said levers and the adjacent extremities of said rods, a bar interconnecting the rear ends of said levers, and means for depressing the first-mentioned bar and elevating the last-named bar simultaneously to lower said rods and engage the brake shoes with the rails.

In testimony whereof I affix my signature in presence of two witnesses.

ISAAC A. MACHAMER.

Witnesses:
JOHN J. MCCARTHY,
BENNETT S. JONES.

Copies of this patent may be obtained for five cents each, by addressing the "Commissioner of Patents. Washington, D. C."